United States Patent [19]
Lin

[11] Patent Number: 5,927,386
[45] Date of Patent: Jul. 27, 1999

[54] COMPUTER HARD DRIVE HEAT SINK ASSEMBLY

[75] Inventor: Chun Hsiung Lin, Duluth, Ga.

[73] Assignee: Macase Industrial Group GA., Inc., Norcross, Ga.

[21] Appl. No.: 09/138,692

[22] Filed: Aug. 24, 1998

[51] Int. Cl.$^6$ ..................................................... H05K 7/20
[52] U.S. Cl. ......................... 165/80.3; 165/121; 165/185; 361/685; 361/695; 361/704; 454/184
[58] Field of Search ................................. 165/80.3, 121, 165/122, 185; 361/685, 687, 704, 707, 695, 697; 174/16.3; 360/97.02; 454/184

[56] References Cited

U.S. PATENT DOCUMENTS

| | | | |
|---|---|---|---|
| 4,642,715 | 2/1987 | Ende | 361/685 X |
| 4,751,872 | 6/1988 | Lawson, Jr. | 361/695 X |
| 5,414,591 | 5/1995 | Kimura et al. | 361/695 |
| 5,596,483 | 1/1997 | Wyler | 361/385 X |
| 5,673,029 | 9/1997 | Behl et al. | 361/695 X |

*Primary Examiner*—Leonard Leo
*Attorney, Agent, or Firm*—Hinkle & Associates, P.C.

[57] ABSTRACT

A computer hard drive heat sink assembly 14 having an interior hard drive receiving channel 23 which fits closely adjacent heat transfer surfaces 24, 26 and 32. Connected to one end of the heat sink assembly is a fan enclosure and panel closure member 17. The fans 16 pull ambient air through the front panel access apertures 18 and supply the ambient air across the heat dissipating surfaces of the heat sink assembly.

10 Claims, 3 Drawing Sheets

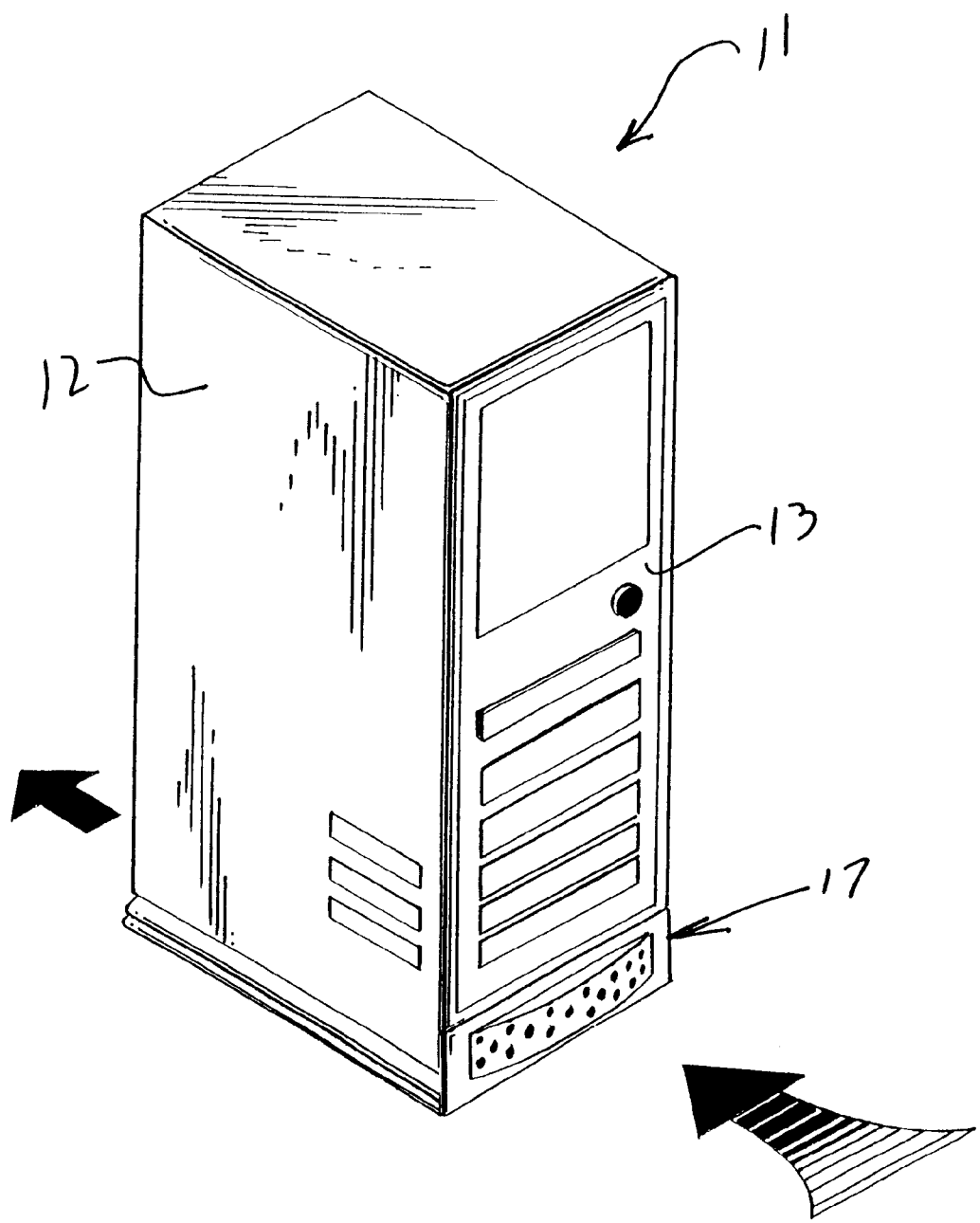
Fig_1

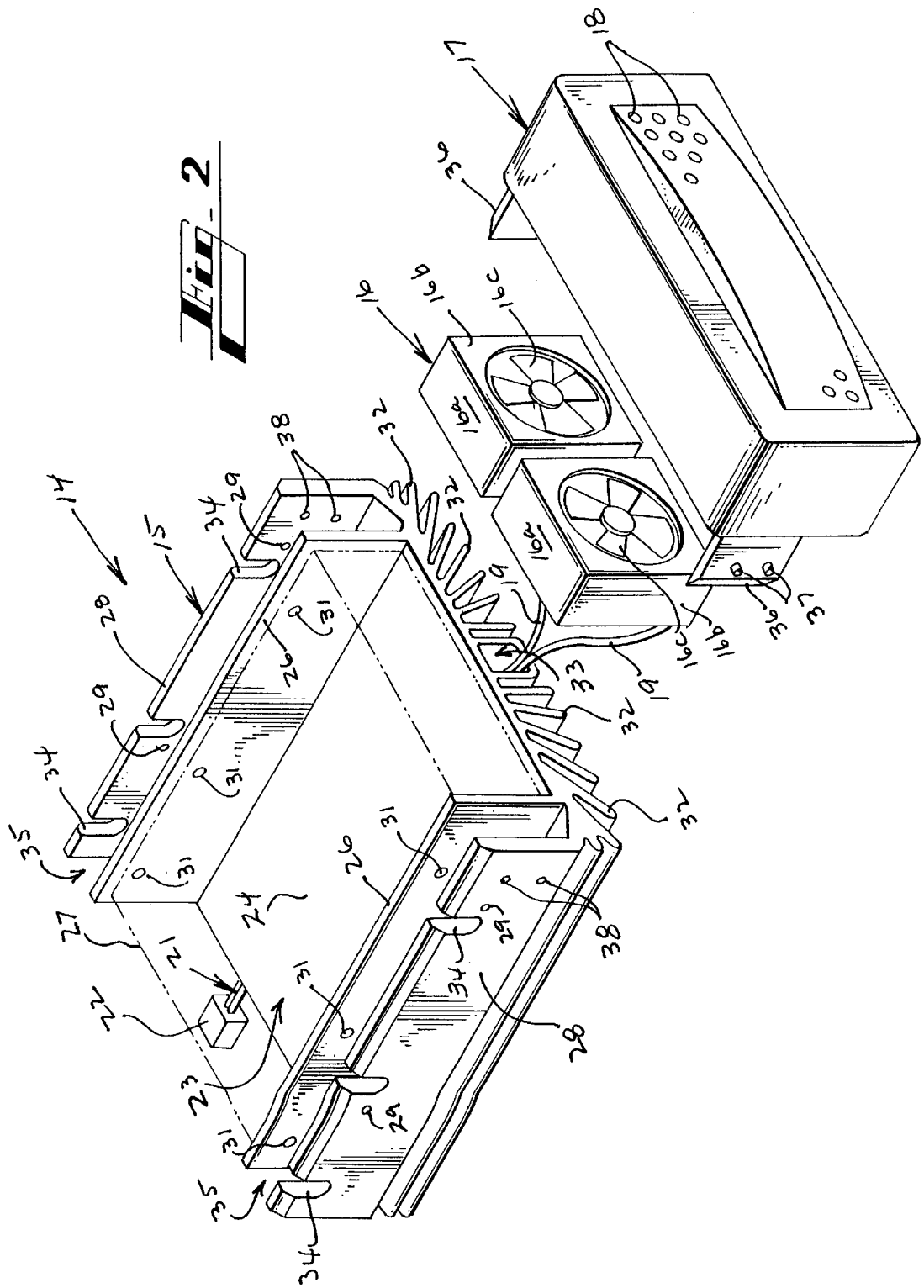

COMPUTER HARD DRIVE HEAT SINK ASSEMBLY

BACKGROUND OF THE INVENTION

I. Field of the Invention

The present invention relates generally to the field of computers. More particularly, the present invention relates to a heat sink assembly to be utilized in computers to assist in the cooling of, and dissipation of heat from, a computer hard drive assembly.

II. Description of the Related Art

As an electrical device, computers typically give off considerable amounts of heat. It is well known that computer cabinets typically have small fan assemblies mounted therein which pull cooling air into the cabinet from the ambient exterior and circulate the air through the cooling cabinet, and ultimately across and around the computer components and then exhaust the cooling air back to the exterior. Typically, these types of fans are mounted in the back panel of a computer and cause the flow of air from the front of the computer across the components and out the back of the computer. Obviously, the flow of air can be accomplished by any reasonable air moving means as long as the computer components are adequately cooled.

However, with the advent of larger and more powerful computer components, especially in the area of memory hard drives, wherein the hard drives operate at exceptionally high speeds, there is a tremendous amount of heat generated by such a hard drive. Obviously, this type of heat needs to be dissipated from the hard drive to protect the hard drive from failure, and the same heat must be disposed of to the ambient atmosphere so that the heat does not affect other components of the computer.

Heat sinks are well known in the electrical arts for dissipating heat from electrical components. In the prior art, there has been no heat sink which has been specifically designed to fit computer hard drives for the efficient dissipation of the heat generated by the hard drives.

SUMMARY OF THE INVENTION

In accordance with the present invention and the contemplated problems which have and continue to exist in this field, the present invention has an objective to provide a computer hard drive cooling heat sink which will conveniently fit into standard computer cabinets to cool high speed hard drives.

Another object of the invention is the provision of a cooling heat sink having an integral structure of heat dissipation surfaces with the provision of integrally mounted cooling fans to efficiently move cooling air across the computer hard drive.

Yet another object of the invention is a specially designed cooling heat sink which will not only accept the cooling fan structure integrally therewith, but will provide wiring raceways to protect the electrical wiring for the cooling fans.

Yet another object of the invention is the provision of a cooling heat sink for computer hard drives which may be accessed quite readily and wherein the cooling fan structure is easily accessible to the end user for maintenance purposes.

This invention accomplishes the above and other objectives by providing a front panel structure of standard size for computer cabinets which will fit into the standard slots normally provided in such cabinets to mount cooling fans in the front panel which attach to the cooling heat sink structure of the invention, which structure will fit into and can be mounted to standard slots in a typical computer cabinet. The heat sink is so designed that the interior thereof has a receiving channel to closely and snugly accept a computer hard drive therein so that the computer hard drive will be in close contact with the receiving channel of the heat sink, wherein heat generated by the computer hard drive will be quickly and readily absorbed by the heat sink material and yet the cooling air from the cooling fans can be distributed across the hard drive to affect maximum cooling thereof.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 is an overall perspective view of a typical computer cabinet housing the cooling heat sink of the present invention, and showing the front access panel;

FIG. 2 is an exploded perspective view of the cooling heat sink and associated structure, and for purposes of clarity the entire assembly is shown upside down;

DESCRIPTION OF THE PREFERRED EMBODIMENT

Figure 4:
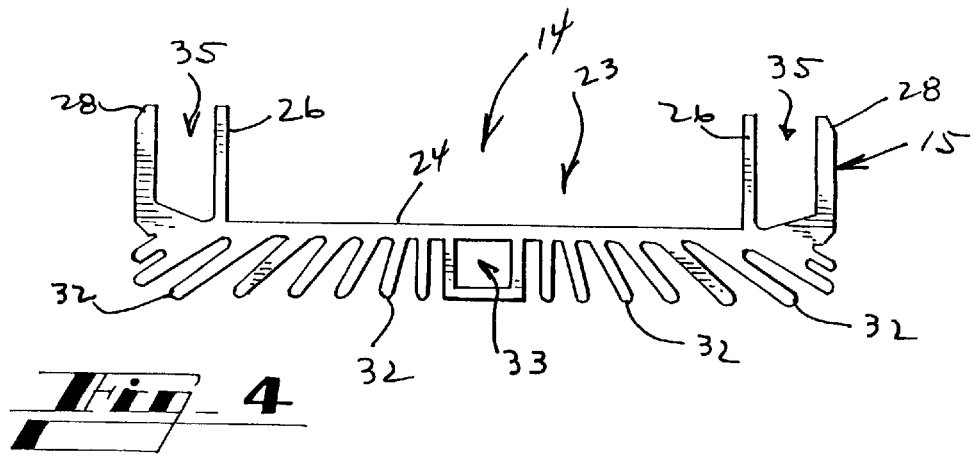
FIG. 4 is a vertical elevation view of the cooling heat sink, also shown upside down.
Figure 3:
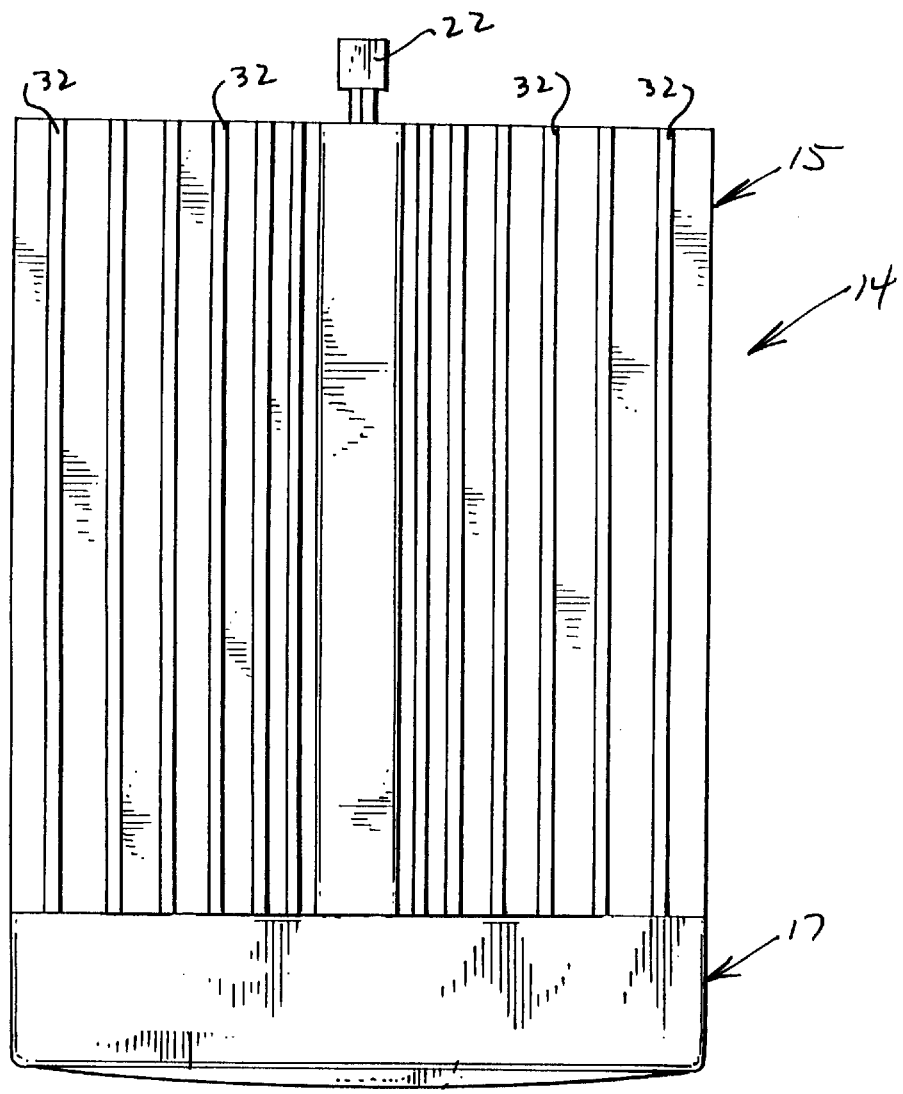
FIG. 3 is a top plan view of the cooling heat sink and associated structure.

Referring to the drawings wherein like reference numerals designate corresponding parts throughout the several figures, reference is made first to FIG. 1. A typical computer cabinet 11 is depicted having a case 12 which covers the interior structure (not shown) of the computer. The case 12 also has a front panel member 13 which will accept, in a slot thereof, the cooling front access panel 17 which houses certain portions of the present invention as will be later described. In FIG. 1, the cooling access panel 17 is shown mounted at the bottom of the front panel 13 of the computer. However, it should be obvious that this particular panel may be mounted in any slot in the front panel of the computer that may conveniently available and which is also properly positioned for support of the hard drive of the computer.

Referring now to FIG. 2, the computer hard drive cooling heat sink assembly of the present invention is generally indicated by the numeral 14. The heat sink assembly 14 comprises three major components, namely, the heat sink unit 15, the cooling fan assembly 16 and the front access panel 17. As previously noted, the front access panel 17 mounts to the computer front panel 13 in any number of satisfactory ways and one of the purposes of the front access panel 17 is to close a suitable slot of the front panel 13, but it also houses the cooling fan assembly 16. The cooling fan assembly 16 generally comprises one or more cooling fan units 16a having a suitable case 16b, and fan blades 16c connected to an electrical motor (not shown). The cooling fan assemblies 16 will be mounted within the front access panel 17 upon suitable mounting structures which are typically lug assemblies in the back side of the access panel 17 which will support the fan assemblies 16, but allow removal thereof for maintenance and other desired purposes. The fan assemblies, when so mounted in the access panel 17, will draw cooling air through the air intake openings 18 in the front of the panel and circulate it through the computer cabinet, but especially will circulate the cooling air over and around the heat sink 15. In order to supply electrical power to the fan assemblies 16, fan power supply leads 19 are attached to the assemblies and are a part of the cooling fan wiring harness 21 which terminates in an electrical power plug 22.

The heat sink 15 comprises a structure having surfaces for dissipating heat and surfaces for accepting a computer hard drive therein which will be closely placed adjacent major structures of the heat sink to assist in dissipating the heat from the hard drive. A portion of the heat sink comprises a receptacle for the computer hard drive and specifically has a receiving channel 23 for the hard drive, which is centrally located within the heat sink 15. To accept and receive the computer hard drive, the receiving channel generally comprises a channel base 24 and side walls 26. Within the confines delineated by the channel base 24 and the side walls 26, the computer hard drive 27 will be placed in close juxtaposition with the base 24 and the side walls 26 so that heat may be easily transferred from the computer hard drive to the structure of the heat sink 15. In FIG. 2, the computer hard drive 27 is represented in phantom lines to show the approximate placement of the hard drive within the heat sink 15.

The heat sink 15 would typically be mounted within the framework of the computer cabinet 11, and be mounted in an area for proper utilization. Typically, a computer cabinet will have sufficient framework to mount various peripherals such as is envisioned with this invention. The heat sink 15 has, for both mounting purposes and heat dissipation purposes, opposing frame members 28 for mounting the heat sink to the computer frame. The frame members are structures which project outwardly from the main body of the heat sink and project in such a manner as to be essentially parallel to the frame members for ease of mounting. In order to mount the frame members 28 to the computer, there are provided screw mounting holes 29. The hard drive 27 would be mounted within the heat sink 15 by placing the hard drive within the receiving channel 23, and placing properly sized screws (not shown) through mounting holes 31 into receiving holes (not shown) in the hard drive. By this procedure, the hard drive is kept in close juxtaposition with the heat sink.

As noted in the description of the figures, the representation of the entire assembly 14 is shown upside down for clarity. In actual use to effectively dissipate the heat, the unit will be mounted so that the hard drive 27 is mounted underneath the heat sink 15 and, therefore, the normal convection of the heat will be upward from the hard drive.

To effectively dissipate the heat from the hard drive which is transmitted to the body of the heat sink, a portion of the heat sink around the periphery thereof comprises heat dissipating fins 32 which project from the body of the heat sink to allow as much air contact as possible to take heat away from the heat sink when the cooling fan assemblies are operating. As seen in FIG. 2, the heat sink assembly has an elongated through channel raceway 33 for receiving the wiring harness 21 which supplies power to the cooling fan assembly 16. In this way, the heat sink assembly routes the wiring harness in an area which is readily cooled by the cooling fan assemblies, and through an area which protects the wiring harness from any possible problem of chaffing with other peripherals within the computer cabinet. In order to properly mount the hard drive within the heat sink 15, the frame members 28 will preferably have access slots 34 to allow a technician to place a screw driver therein to access the screws which fit through mounting holes 31.

In operation, once the heat sink 15 is mounted within the computer cabinet and the hard drive is mounted properly therein, the entire heat sink assembly 14 is positioned within the computer cabinet. Once the computer is energized, the cooling fan assemblies 16 will operate drawing air through the air intake openings 18, through the fan cases 16b which distribute the cooling air across the hard drive 27, and across and around heat dissipating fins 32, and through the heat dissipating channels 35. The large effective area of surfaces which are presented to the cooling air will quickly dissipate the high heat that is produced by the hard drive 27.

To mount the front access panel and fan support 17 to the heat sink 15, the individual fans 16a are mounted within the panel 17 by suitable fasteners and/or lugs which properly position the fans within the panel 17, and then the panel 17 is then snapped into position within the heat sink 15. The mounting of the panel is accomplished by positioning the extended panel mounting arms 36 to the interior forward surface of the frames 28 so that the locking lugs 37 of panel mounting arms 36 will snap into locking position in the locking lug receiving holes 38. Once the front access panel and fan support assembly 17 is locked in position with the heat sink 15 with the cooling fan assemblies 16 positioned within the front access panel 17, the unit is ready for insertion into the computer cabinet. This is easily accomplished in the normal manner of affixing peripherals within a computer cabinet.

As shown and described, the heat sink assembly 14 is specifically designed to hold a high speed hard disk drive and to dissipate the heat therefrom in a most efficient manner. The heat dissipation is accomplished by flowing, cooling air across the heat sink 15 when the individual fans 16a are operating which draw cooling air through the intake openings 18 through the fans 16a and ultimately across the heat sink 15 around, through and over the various heat dissipating surfaces 32 and 28, along with flowing the air across the hard drive assembly 27. A very efficient mechanism for accomplishing the desired objects of the invention has been shown and described.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A computer hard drive heat sink assembly for dissipating heat generated by the hard drive comprising:

a heat sink, the heat sink being of a generally U-shaped configuration having a channel base and opposed upstanding side walls projecting from the channel base defining a receiving channel for holding the computer hard drive, the channel base having a receiving surface and an opposite side heat release surface, the heat sink having a front end and a rear end, an access panel member having a housing with a top wall and a bottom wall connected by opposing side walls, a front wall connecting the top, bottom and side walls to form an interior enclosure of the access panel, the front wall of the access panel member having a plurality of openings therein for ambient air ingress, air induction fan means positioned within the interior enclosure of the access panel, and the access panel being mounted to the front end of the heat sink.

2. The heat sink assembly as claimed in claim 1, wherein the heat release surface has cooling fins projecting from the heat release surface.

3. The heat sink assembly as claimed in claim 1, wherein each opposed side wall has an adjacent frame wall defining an air flow cavity therebetween, the frame wall comprising an outwardly projecting spacer wall having a proximal edge connected to the adjacent side wall and further having a distal edge, a downwardly projecting mounting wall integral with the distal edge of the spacer wall.

4. The heat sink assembly as claimed in claim 1, the access panel having mounting means for placement of the access panel in juxtaposition with the heat sink to position the air induction fan means adjacent to the heat sink.

5. The heat sink assembly as claimed in claim 2, and further having an enclosed raceway juxtaposed with the heat release surface and connecting the front end of the heat sink with the rear end of the heat sink.

6. The heat sink assembly as claimed in claim 4, wherein the air induction fan means comprises a single electrical fan unit.

7. The heat sink assembly as claimed in claim 6, wherein the air induction fan means comprises a plurality of electrical fan units.

8. The heat sink assembly as claimed in claim 4, wherein the access panel has a plurality of mounting arms for mounting the access panel to the heat sink, each mounting arm of the access panel having at least one projecting locking lug, the downwardly projecting mounting wall having at least one locking lug recess aperture to receive the at least one locking lug of each mounting arm into locking engagement.

9. The heat sink assembly as claimed in claim 5, wherein the air induction fan means has an electrical wiring harness connected thereto, the wiring harness being positioned in the raceway of the heat sink.

10. A computer hard drive heat sink assembly for dissipating heat generated by the hard drive comprising:

a heat sink, the heat sink having a generally U-shaped configuration and having a channel base and opposed upstanding side walls projecting from the channel base defining a receiving channel for holding the computer hard drive, the channel base having a receiving surface and an opposite side heat release surface, the heat release surface having cooling fins projecting from the heat release surface, the heat sink having a front end and a rear end, an enclosed raceway juxtaposed with the heat release surface and connecting the front end of the heat sink with the rear end of the heat sink, each opposed side wall having an adjacent frame wall defining an air flow cavity therebetween, the frame wall comprising an outwardly projecting special wall having a proximal edge connected to the adjacent side wall, and further having a distal edge, a downwardly projecting mounting wall integral with the distal edge of the special wall, an access panel member having a housing with a top wall and a bottom wall connected by opposing side walls, a front wall connecting the top, bottom and side walls to form an interior enclosure of the access panel, the front wall of the access panel member having a plurality of openings therein for ambient air ingress, air induction fan means positioned within the interior enclosure of the access panel, the air induction fan means comprising at least one electrical fan unit, the access panel having a plurality of mounting arms for placement in juxtaposition with the heat sink to position the air induction fan means adjacent to the heat sink, each mounting arm of the access panel having at least one projecting locking lug, the downwardly projecting mounting wall having locking lug recess apertures to receive the locking lugs of at least one panel mounting arm into locking engagement therewith, and the air induction fan means having an electrical wiring harness connected thereto, the wiring harness being positioned in the raceway of the heat sink.

* * * * *